Dec. 10, 1968  B. E. WRENSCH  3,415,347
POLE STRUCTURE FOR ELECTROMAGNETIC CLUTCH OR BRAKE WITH
STATIONARY MAGNET AND METHOD OF MANUFACTURE THEREOF
Filed Jan. 26, 1967  2 Sheets-Sheet 1
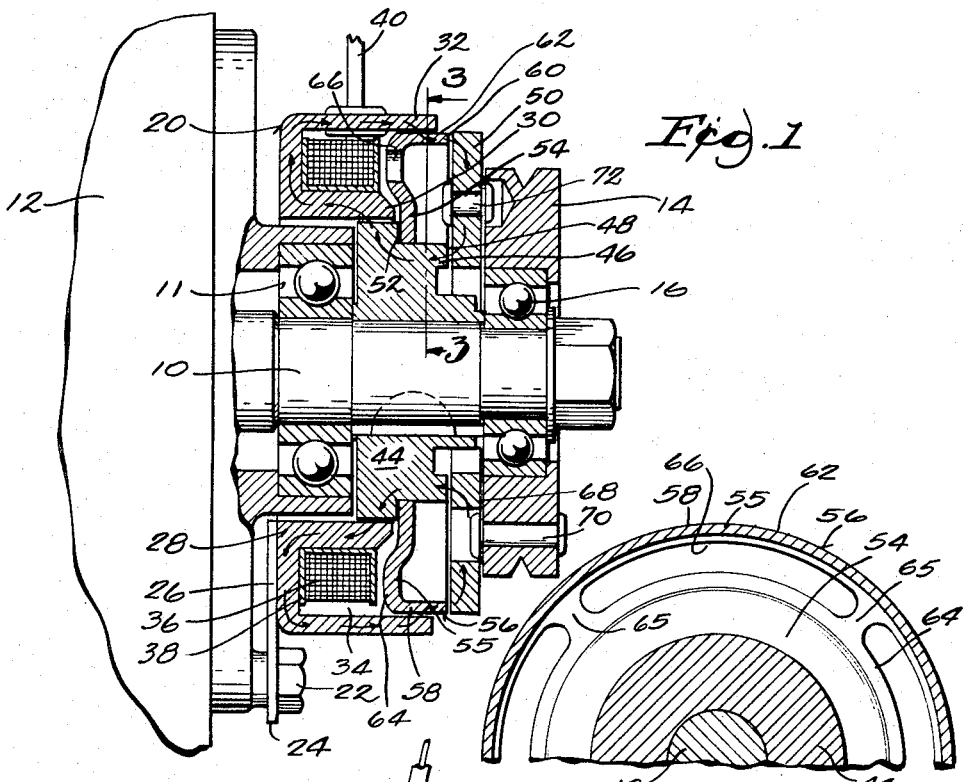
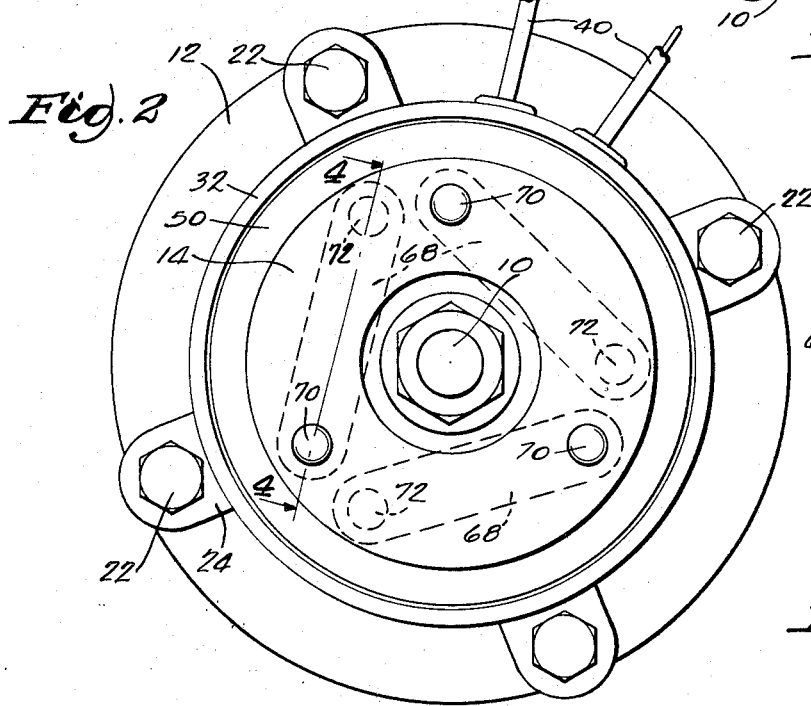
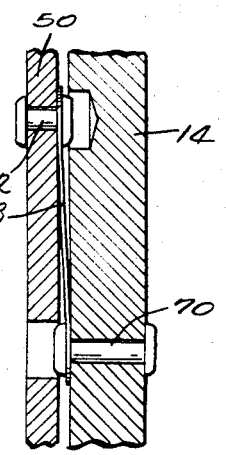
INVENTOR
BERNARD E. WRENSCH
BY Wheeler, Wheeler, House & Clemency
ATTORNEYS Dec. 10, 1968    B. E. WRENSCH    3,415,347
POLE STRUCTURE FOR ELECTROMAGNETIC CLUTCH OR BRAKE WITH
STATIONARY MAGNET AND METHOD OF MANUFACTURE THEREOF
Filed Jan. 26, 1967    2 Sheets-Sheet 2
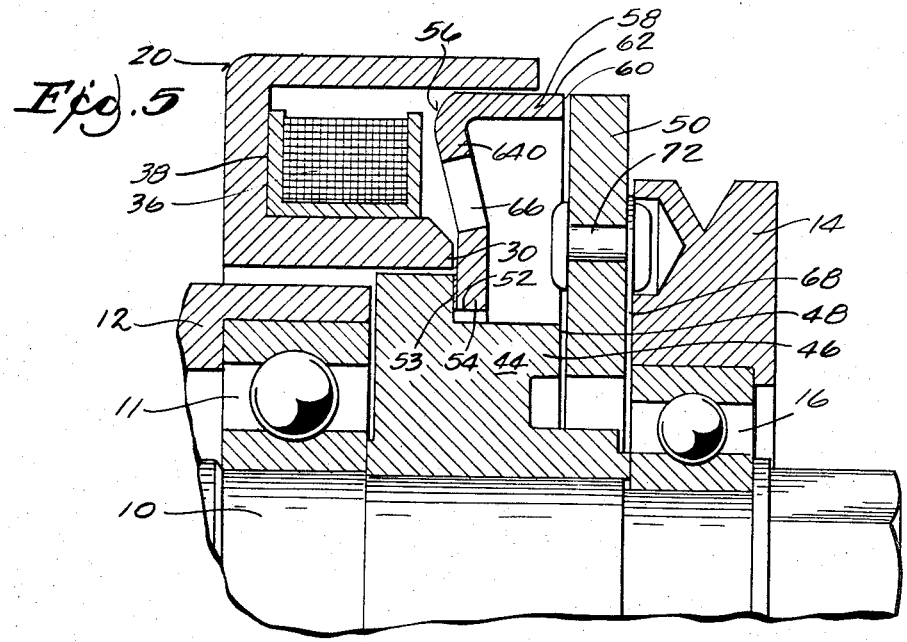
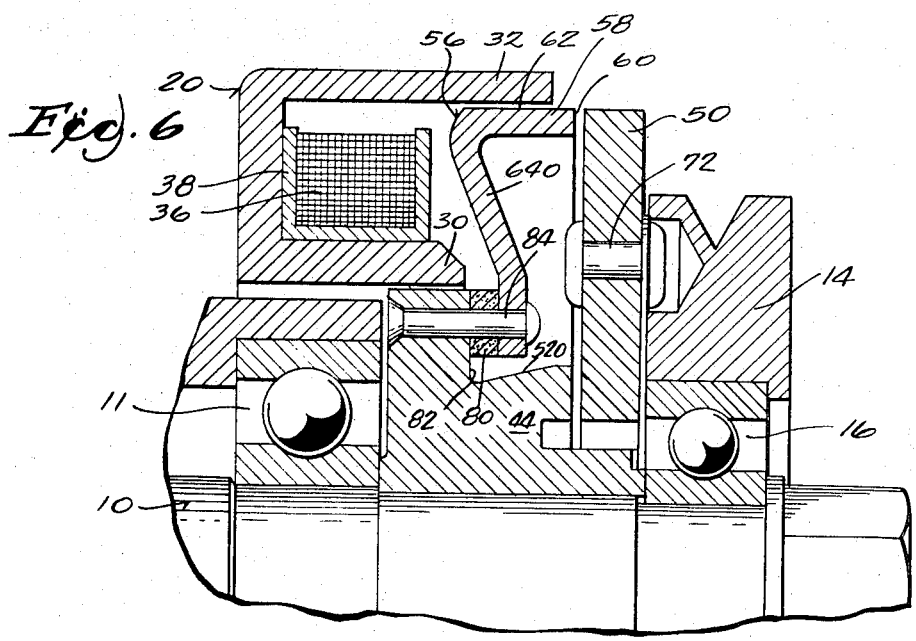
INVENTOR
BERNARD E. WRENSCH
BY Wheeler, Wheeler, House & Clemency
ATTORNEYS United States Patent Office 3,415,347
Patented Dec. 10, 1968

3,415,347
POLE STRUCTURE FOR ELECTROMAGNETIC CLUTCH OR BRAKE WITH STATIONARY MAGNET AND METHOD OF MANUFACTURE THEREOF
Bernard E. Wrensch, Brookfield, Wis., assignor to Stearns Electric Corporation, Milwaukee, Wis., a corporation of Wisconsin
Filed Jan. 26, 1967, Ser. No. 612,004
9 Claims. (Cl. 192—84)

ABSTRACT OF THE DISCLOSURE

The primary annular poles of a stationary magnet energize outer and inner extension poles on one of the members to be clutched and for which the other member provides an armature. The armature has a floating mounting for movement to and from engagement with the extension poles. The hub of the first member provides the inner extension pole and a specific feature of the invention consists in an arrangement whereby the outer extension pole is formed by a cup-shaped stamping having an intermediate web portion offset and having its rim peripherally ground or otherwise machined to true cylindrical form to fit closely within the primary outer pole of which it is an extension.

Background of the invention

It is well known to provide clutches and brakes with stationary annular magnets for energizing auxiliary poles on one member to attract an armature on a coaxial member. There has been a continuous effort to simplify such devices and not only to reduce the cost of manufacture but to render the electromagnet more effective. An example of prior art work on this problem is Patent 2,864,478, P. A. Harter et al., December 16, 1958. It will be understood that in referring herein to a clutch, it is intended to include brakes, since a brake is essentially a clutch which operates to engage a movable part with a fixed part, rather than with another movable part.

Summary of invention

In a clutch of the indicated type, the outer primary pole of the stationary annular magnet is elongated to project materially farther beyond the winding than does the inner primary pole. The hub comprises an inner extension pole proximate the inner primary pole and lapped thereby. It supports a cup-shaped annulus having its magnetically isolated outer rim constituting an outer extension pole and closely fitted within the elongated outer primary pole for a substantial portion of its axial projection beyond the winding. To achieve this result in compact structure, the generally radial web which integrally connects the rim flange of the annulus with the hub is dished or otherwise offset into the channel and toward the winding between the inner and outer primary poles of the stationary magnet. As a result, the lap of the rim flange with respect to the outer pole of the magnet extends axially at both sides of the radial plane of its mounting on the hub. This annulus preferably comprises a sheet metal stamping having its outer rim trued to cylindrical form by grinding or otherwise machining it so that it can be rotated with minimum clearance proximate the stationary outer primary pole.

The ends of the inner and outer extension poles directly provide friction surfaces engaged by a floating armature which is movable to and from engagement with the extension poles by reason of its support on flexible straps which connect it with the complementary part of the clutch, whether this be a stationary part or a rotor.

Since it is a feature of the invention that the outer extension pole is integral with the means which mounts it from the hub, it is desirable to provide some means of magnetically isolating the outer and inner poles from each other to assure that the magnetic circuit will include the armature instead of being shorted through the annulus on which the outer extension pole is formed. Two means of doing this are disclosed. In one embodiment, the bypassing of flux is minimized by removing metal from the web which supports the outer extension polar flange. In another embodiment, the supporting web is isolated from the hub by an interposed ring of nonmagnetic material.

Brief description of drawings

FIG. 1 is a view in axial section embodying the invention, portions of the motor upon which the clutch is mounted being shown in elevation.

FIG. 2 is a view in elevation of the assembly shown in FIG. 1.

FIG. 3 is a fragmentary detail view in section on the line 3—3 of FIG. 1.

FIG. 4 is a fragmentary view in section on the line 4—4 of FIG. 2.

FIG. 5 is a view of a modified embodiment fragmentarily shown in section on an enlarged scale.

FIG. 6 is a view similar to FIG. 5 showing different embodiments of the invention.

Description of the disclosure

A clutch for connecting two coaxial rotors has been selected as illustrative of the invention. One of the rotors comprises a shaft 10 rotating in bearings 11 of shell 12, which may represent the casing of a driving device such as a motor, or a driven device such as a compressor. The other rotor comprises a sheave 14 which is coaxial with the shaft, relative rotation being accommodated by bearings 16.

An energizing magnet 20 is mounted on the rotor 10 by means of the bolts 22 which extend through the ears 24 of a disk 26 on which the core 28 of the magnet is mounted. The magnet core is an annulus having an inner primary pole 30 and an outer primary pole 32. As is clearly shown in the drawings, the outer pole 32 has considerably greater extent axially than the inner pole 30. Between these primary poles there is an annular channel at 34 to receive the winding 36. A spool 38 on which the winding is wound may be cemented to core 28 to retain it within the channel. It is supplied with current by wires 40.

Even the inner primary pole 30 extends somewhat beyond the winding spool 38 to assure a cylindrical area of substantial length in proximity to the periphery of a hub 44 which is fixed to the shaft. This hub has a terminal annular flange at 46 which constitutes the inner extension pole and also provides on its end face 48 a friction surface which is engaged by an armature 50 when the magnet is energized.

To a shoulder 52 on hub 44 is brazed or otherwise connected the central mounting flange portions 54 of the web 55 of an annulus 56. The annulus is cup-shaped, having an outer flange 58 constituting the outer extension pole. The terminal face 60 at the end of the flange provides a clutch face engaged by the armature 50 when the magnet is energized. The outer periphery of flange 58 is preferably finished with precision to a cylindrical surface 62 either by grinding or machining it so that it will be precisely concentric with the stationary pole 32 of the magnet and will be rotatable therein with very little magnetic gap. In order to provide maximum axial extent of lap between the fixed pole 32 of the magnet and the rotatable extension pole 58, the intermediate part 64 of the annulus 56 between the polar rim flange 58 and the generally radial mounting flange 54 is dished or deformed axially toward the magnet winding. The offset elongates the rim flange so that it extends axially at both sides of the mounting plane of the annulus. This makes possible an elongated cylindrical gap area for both poles and accomplishes this result in a compact structure.

To obstruct flux leakage radially through the intermediate portion 64 of annulus 56, such intermediate portion is provided in this embodiment with elongated slots 66, leaving only angularly spaced spoke-like portions 65 of the intermediate part 64 of the annulus (FIG. 3). The small remaining cross section bypasses relatively little flux.

The member 14 which is to be clutched to member 10 may, as already stated, be coaxially rotatable or it may be fixed against rotation, if the device functions as a brake. To support the armature 50 for axial movement with respect to member 14, while precluding relative angular movement, it is preferred to use flexible straps 68 connected at corresponding ends to the member 14 by rivets 70 and connected at their opposite ends to the armature 50 by rivet 72. These straps may be made of clock-spring material if desired and may be biased when the armature is drawn to the extension poles for clutching purposes so that when the winding 36 is deenergized, the armature will tend to be withdrawn by the resilient straps or links from contact with the extension poles. It is the friction of the armature on the extension poles which supplies the clutch (or brake) action.

In FIG. 1, I have illustrated by arrows the flux flow through the outer primary pole 32 into the polar rim flange extension 58 of the cup-shaped annulus 56 and thence through the armature 50 to the polar extension flange 46 of hub 44 and returning from the hub to the lapping inner primary pole of the magnet body. When the winding is energized, the combination armature and clutch disk 50 engages the extension poles to complete clutching engagement between members 10 and 14. When the winding is de-energized, the magnetic attraction of the armature and clutch disk 50 is released and the members 10 and 14 are declutched.

FIG. 5 shows a very slight modification on a much larger scale. The intermediate part 640 of the annulus 56 is oblique in section instead of being bodily offset as in the construction of FIG. 1. The brazing at 53 which connects the mounting portion 54 of the annulus in spaced relation to the hub 44 is clearly apparent.

FIG. 6 shows another modification in which the intermediate portion 640 is similarly formed but spaced somewhat farther from the inner primary pole 30 of the magnet 20, the entire annulus 56 being offset axially by interposing a nonmagnetic ring 80 between the annulus 56 and the face 82 of the hub 44. The shoulder 520 is undercut to afford greater clearance between the annulus 56 and the hub 44. Nonmagnetic rivets 84 hold the annulus 56 to the face 82 of the hub. While the materials of which these parts are made are relatively unimportant, it is noted by way of example and not by way of limitation that the ring 80 may be made of bronze and the rivets 84 may be stainless steel.

The operation of the embodiment shown in FIGS. 5 and 6 is identical with that already described in connection with FIGS. 1 to 4. In all embodiments, precision finishing is desirable only as to the frictionally engageable surfaces between the armature and the extension faces and at the concentric surfaces between the hub and the primary inner pole 30 and between the polar extension flange 58 and the fixed primary pole 32 of the magnet 20.

Thus a very effective clutch device is provided with few parts which are easily and inexpensively made.

What is claimed is:

1. In an electromagnetically operable clutch comprising an annular stationary magnet having a magnet frame provided with an annular channel containing a winding and having primary inner and outer annular poles projecting axially beyond said winding, the outer pole having greater axial extent than the inner pole, and means providing inner and outer polar extensions rotatably mounted and having surfaces in immediate proximity to the said primary poles, and an armature mounted for movement toward and from said extensions, the armature and said polar extensions having friction surfaces engageable when the winding is energized; the improvement which consists in the provision of a cup-shaped annulus having a central mounting portion for which the inner polar extension provides a hub, and a web extending thence radially across said winding, and an integral outer rim flange constituting said outer polar extension and extending from said web in a direction away from the winding and in concentricity with, and in flux transmitting proximity to, the inner surface of said outer annular pole.

2. An electromagnetically operated clutch according to claim 1 in which said cup-shaped annulus is sheet metal and said rim flange has a true cylindrical surface of substantially constant radius.

3. An electromagnetically operated clutch according to claim 2 in which the means for providing polar extensions includes a cylindrical peripheral surface immediately proximate to the stationary inner primary pole of said magnet, said hub having a shoulder and being provided beyond the shoulder with said polar extension, the said annulus being fixed to the hub outside of said shoulder.

4. An electromagnetically operated clutch according to claim 3 in which means for fixing the annulus to the hub includes a brazed connection of the annulus to the hub.

5. An electromagnetically operated clutch according to claim 3 in which means for fixing the magnet to the hub includes a nonmagnetic spacer ring holding the annulus in spaced relation to the hub and nonmagnetic rivets connecting the annulus with a portion of the hub.

6. An electromagnetically operated clutch according to claim 1 in which an armature supporting member has links spaced circumferentially about the armature, and said links are respectively connected at opposite ends to the armature and said member.

7. An electromagnetically operated clutch according to claim 6 in which said last mentioned member has means mounting it for rotation coaxially with said hub.

8. An electromagnetically operated clutch comprising in combination a mounting shaft, an annularly shouldered hub on said shaft having a polar extension with a friction face, an annulus fixed to said hub and having a rim flange provided with a polar extension having a friction face, an armature having means mounting it for axial movement to and from engagement with the said friction faces of the hub and rim flange, and means for magnetizing said polar extensions including an electromagnet having inner and outer annular primary poles and an intervening winding, the inner primary pole of the electromagnet lying proximate to the hub and terminating short of said annulus, the outer primary pole of the electromagnet having a surface extending axially along said rim flange in closely spaced external proximity thereto, said annulus having integrally an inner mounting web portion, an intermediate web portion offset from said inner portion toward said winding and continuing past said winding and connected with that portion of said rim flange which is nearest said winding, and means for obstructing the short circuiting of magnetic flux between the primary poles of the magnet through the material of said annulus.

9. An electromagnetically operated clutch according to claim 8 in which the offset of the intermediate web portion is such that the mounting web portion is spaced axially from the inner primary pole but said rim flange extends axially at both sides of the plane of said mounting web portion.

(References on following page)

References Cited

UNITED STATES PATENTS

| | | | |
|---|---|---|---|
| 2,864,478 | 12/1958 | Harter et al. | 335—281 |
| 2,919,776 | 1/1960 | Pierce | 192—84 |
| 2,919,777 | 1/1960 | Walter | 192—84 |
| 3,055,475 | 9/1962 | Pitts | 192—84 |
| 3,172,514 | 3/1965 | Hansen | 192—84 |

MARTIN P. SCHWADRON, *Primary Examiner.*

C. LEEDOM, *Assistant Examiner.*

U.S. Cl. X.R.

335—281